(12) United States Patent
Yoshida et al.

(10) Patent No.: US 11,146,154 B2
(45) Date of Patent: Oct. 12, 2021

(54) METHOD OF MANUFACTURING A ROTOR

(71) Applicants: Mitsui High-tec, Inc., Kitakyushu (JP); TOYOTA JIDOSHA KABUSHIKI KAISHA, Toyota (JP)

(72) Inventors: Kohei Yoshida, Kitakyushu (JP); Shinya Sano, Toyota (JP)

(*) Notice: Subject to any disclaimer, the term of this patent is extended or adjusted under 35 U.S.C. 154(b) by 141 days.

(21) Appl. No.: 16/591,635

(22) Filed: Oct. 3, 2019

(65) Prior Publication Data

US 2020/0112237 A1 Apr. 9, 2020

(30) Foreign Application Priority Data

Oct. 5, 2018 (JP) .............................. JP2018-189930

(51) Int. Cl.
| | | |
|---|---|---|
| H02K 15/02 | (2006.01) | |
| H02K 15/03 | (2006.01) | |
| H02K 15/12 | (2006.01) | |
| H02K 1/28 | (2006.01) | |
| H02K 1/27 | (2006.01) | |

(52) U.S. Cl.
CPC .............. *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ............ H02K 7/04; H02K 15/03; H02K 1/28; H02K 15/02; H02K 15/165; H02K 15/16; H02K 1/27; Y10T 29/49012
USPC .................. 29/598, 596, 604, 607, 609, 732
See application file for complete search history.

(56) References Cited

U.S. PATENT DOCUMENTS

| | | | | |
|---|---|---|---|---|
| 8,786,154 | B2 * | 7/2014 | Kim ....................... | H02K 1/276 310/156.09 |
| 10,848,039 | B2 * | 11/2020 | Nagai .................... | H02K 15/03 |
| 2013/0140937 | A1 | 6/2013 | Kim | |
| 2018/0069450 | A1 | 3/2018 | Takeuchi et al. | |
| 2018/0076700 | A1 | 3/2018 | Nagai et al. | |

FOREIGN PATENT DOCUMENTS

| | | |
|---|---|---|
| CN | 103138434 | 6/2013 |
| CN | 107809156 | 3/2018 |
| JP | S60-077267 | 5/1985 |
| JP | H2-118445 | 9/1990 |
| JP | 2009-201258 | 9/2009 |
| JP | 2012-161209 | 8/2012 |
| JP | 2013-021802 | 1/2013 |
| JP | 2017-041990 | 2/2017 |
| JP | 2017-147775 | 8/2017 |
| JP | 2018-042379 | 3/2018 |

* cited by examiner

*Primary Examiner* — Thiem D Phan
(74) *Attorney, Agent, or Firm* — Soei Patent & Law Firm

(57) ABSTRACT

A method of manufacturing a rotor includes mounting a plurality of core members to a shaft in a state by inserting the shaft into a shaft hole that penetrates through the plurality of core members in a height direction. An inner diameter of the shaft hole is larger than an outer diameter of the shaft. The method includes pressing the plurality of stacked core members together in the height direction to form a stack in which the plurality of core members are located adjacent to each other, and the shaft hole is engaged with the shaft.

19 Claims, 13 Drawing Sheets

METHOD OF MANUFACTURING A ROTOR

CROSS-REFERENCE TO RELATED APPLICATIONS

This application is based upon and claims the benefit of priority from Japanese Patent Application No. 2018-189930, filed on Oct. 5, 2018, the entire contents of which are incorporated herein by reference.

FIELD

The present disclosure relates to a method of manufacturing a rotor.

BACKGROUND

The rotor is formed by inserting a shaft into the shaft hole of the stacked rotor core. Generally, it is obtained by stacking a plurality of blanked members obtained by blanking a metal plate (for example, an electrical steel sheet) into a predetermined shape. Therefore, the blanked member may not be flat due to distortion generated in the metal plate during blanking. Generally, the thickness of the metal plate is not completely uniform and slightly varies. Therefore, the shaft hole formed in the blanked member may be in a state of extending obliquely with respect to the height direction of the blanked member. Therefore, if the plurality of blanked members are stacked to constitute a stacked rotor core, the shaft hole of the stacked rotor core can be non-linear.

Japanese Unexamined Patent Publication No. 2012-161209 discloses a method of shrink fitting a shaft into a shaft hole in order to smoothly insert the shaft into a non-linear shaft hole. Specifically, the method includes heating the stacked rotor core to a predetermined temperature, enlarging the shaft hole by thermal expansion of the stacked rotor core, inserting the shaft into the enlarged shaft hole, and lowering the temperature of the stacked rotor core.

SUMMARY

A method of manufacturing a rotor according to one aspect of the present disclosure includes mounting a plurality of core members to a shaft in a state by inserting the shaft into a shaft hole that penetrates through the plurality of core members in a height direction, an inner diameter of the shaft hole being larger than an outer diameter of the shaft, pressing the plurality of stacked core members together in the height direction, to form a stack in which the plurality of core members are located adjacent to each other, and the shaft hole is engaged with the shaft.

DETAILED DESCRIPTION

In the following description, with reference to the drawings, the same reference numbers are assigned to the same components or to similar components having the same function, and overlapping description is omitted.

Configuration of Rotor

Figure 1:
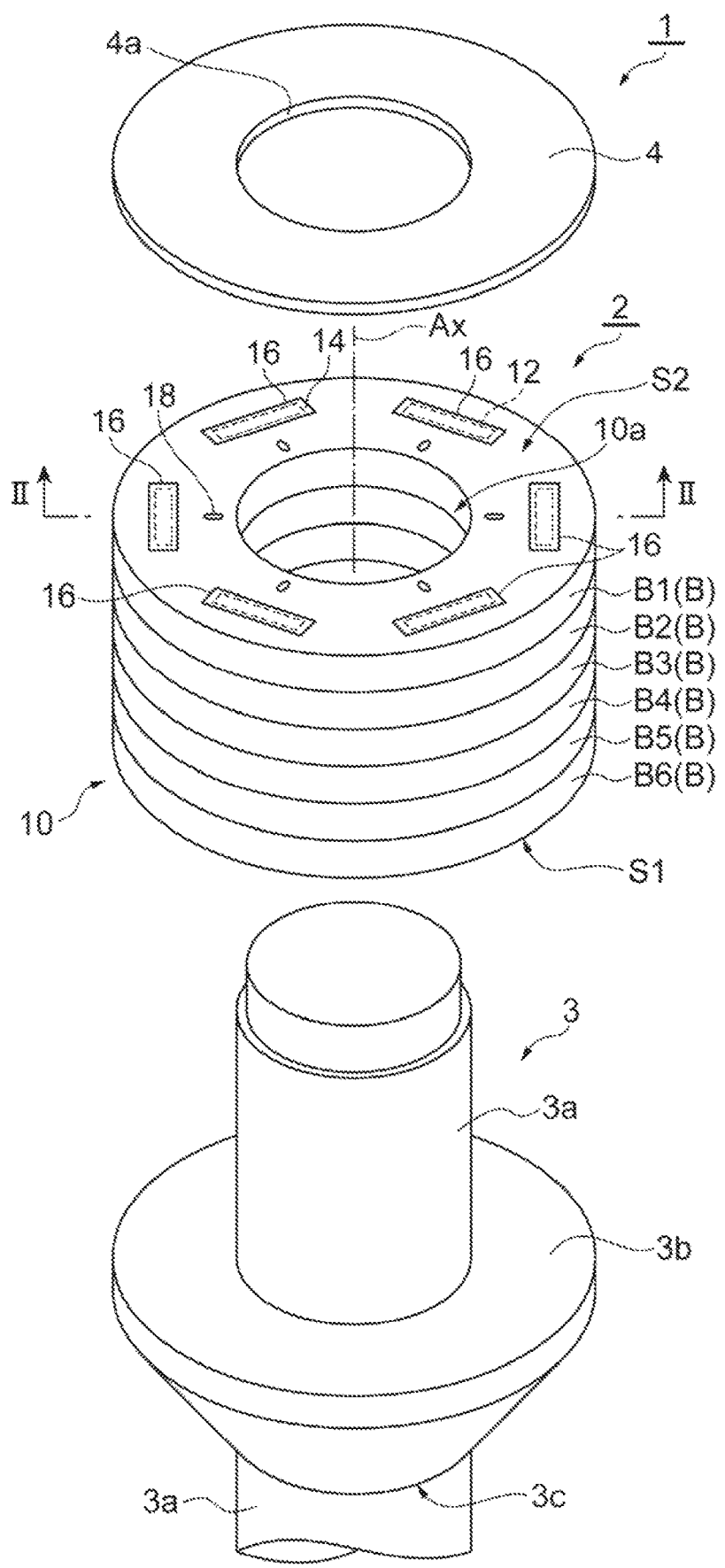
FIG. 1 is an exploded perspective view showing an example of a rotor.
Figure 2:
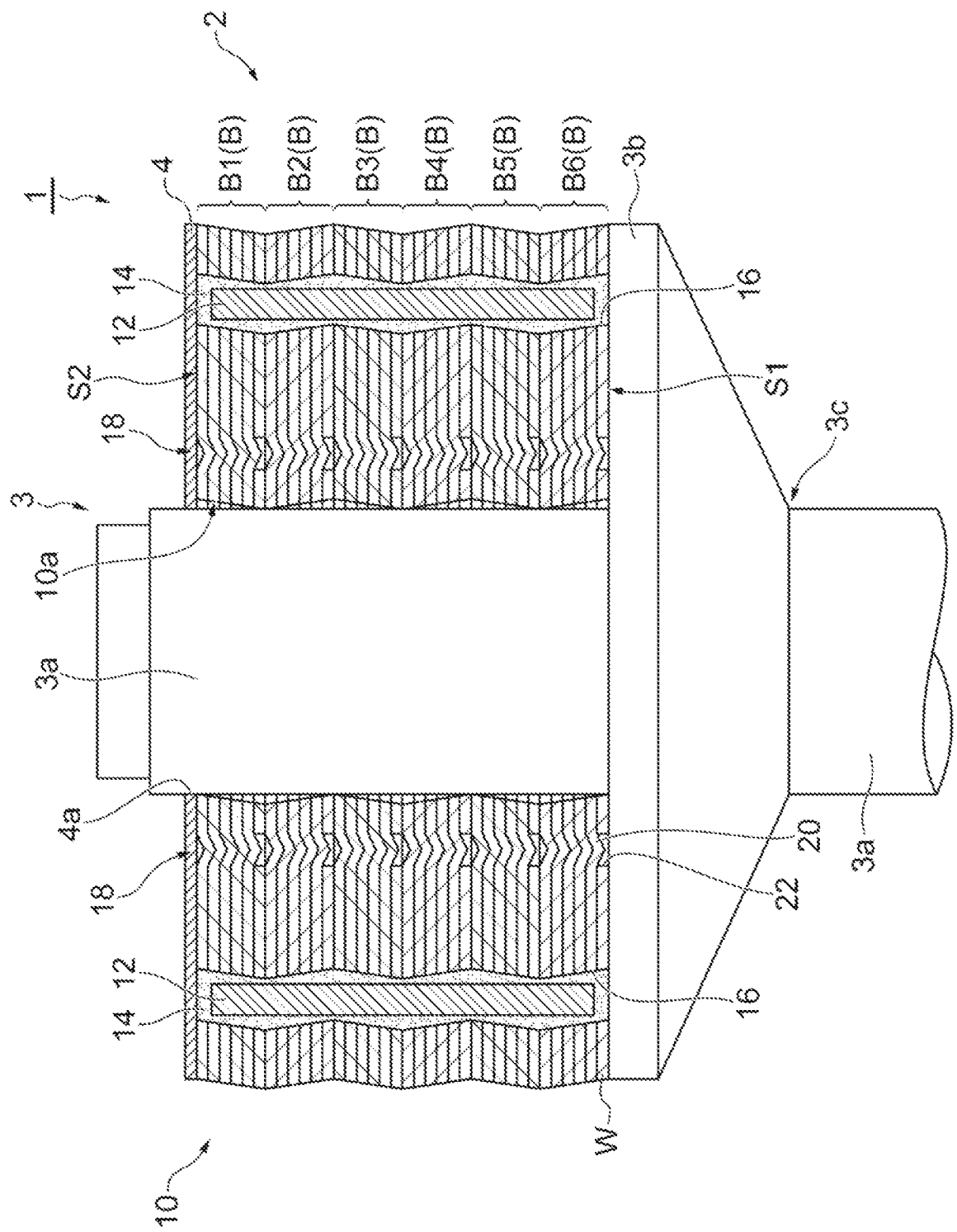
FIG. 2 is a cross-sectional view taken along the line II-II in FIG. 1.

First, the configuration of a rotor 1 is described with reference to FIGS. 1 to 3. As shown in FIGS. 1 and 2, the rotor 1 includes a stacked rotor core 2 (core main body), a shaft member 3, and an end face plate 4. The rotor 1 is combined with the stator to form an electric motor (motor). The rotor 1 in this example is used for an interior magnet type (IPM) motor.

As shown in FIGS. 1 and 2, the stacked rotor core 2 includes a stack 10, a plurality of permanent magnets 12, and a plurality of solidified resins 14.

In the stack 10, a plurality of blocks B (core members) are stacked in order. In the example shown in FIGS. 1 to 3, six blocks B1 to B6 are arranged from the upper side to the lower side in this order so as to be stacked as the stack 10. In a stacking direction of the blocks B (hereinafter, simply referred to as a "stacking direction"), the adjacent blocks B are joined and integrated to each other.

The stack 10 may be configured by so-called rotational stacking. "Rotational stacking" refers to stacking a plurality of blocks B while the angles of the blocks B are relatively shifted. The rotational stacking is mainly performed for the purpose of offsetting the thickness deviation of the stack 10. The angle of rotational stacking may be set to arbitrary sizes.

Figure 3:
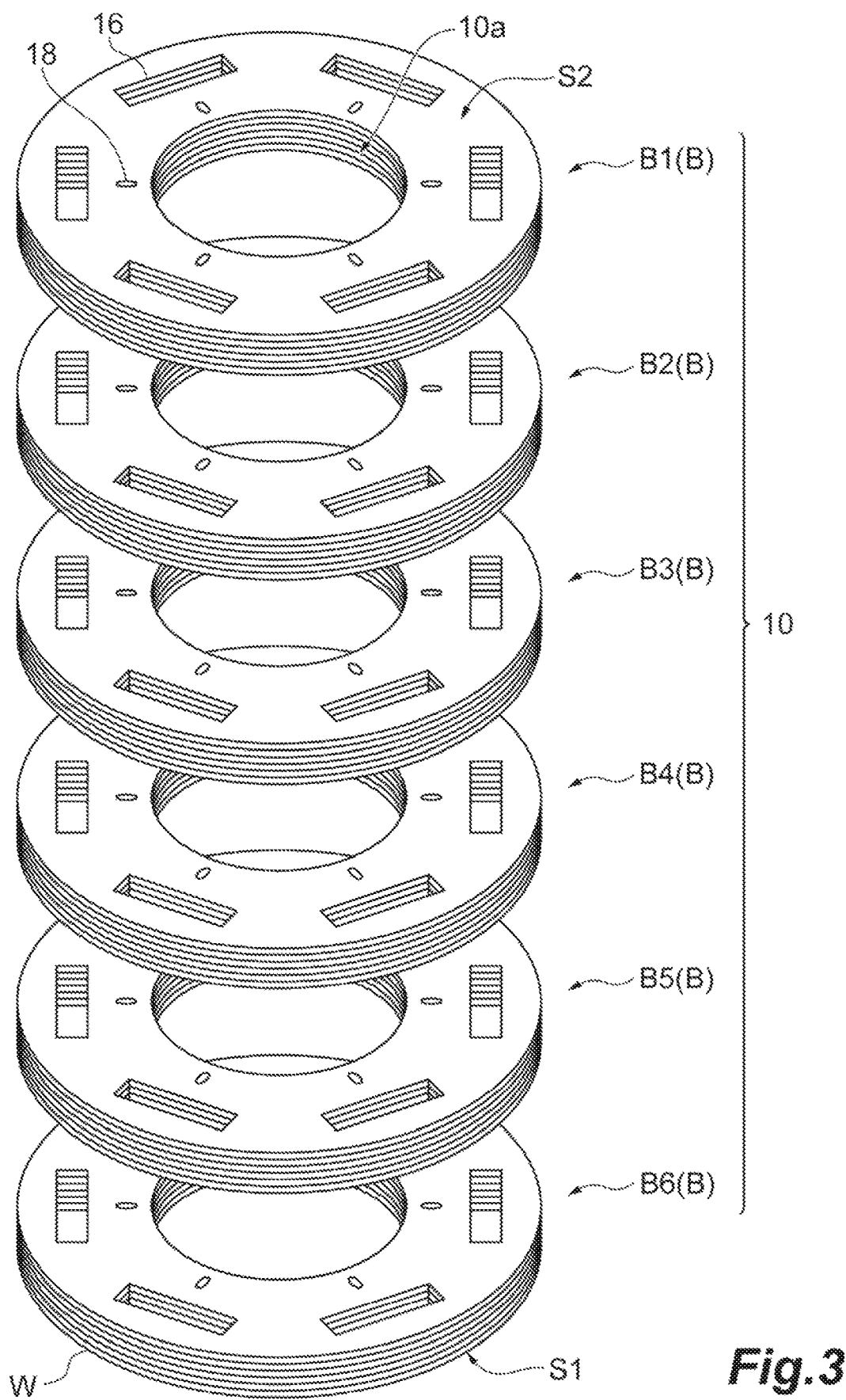
FIG. 3 is an exploded perspective view of a stack.
Figure 4:
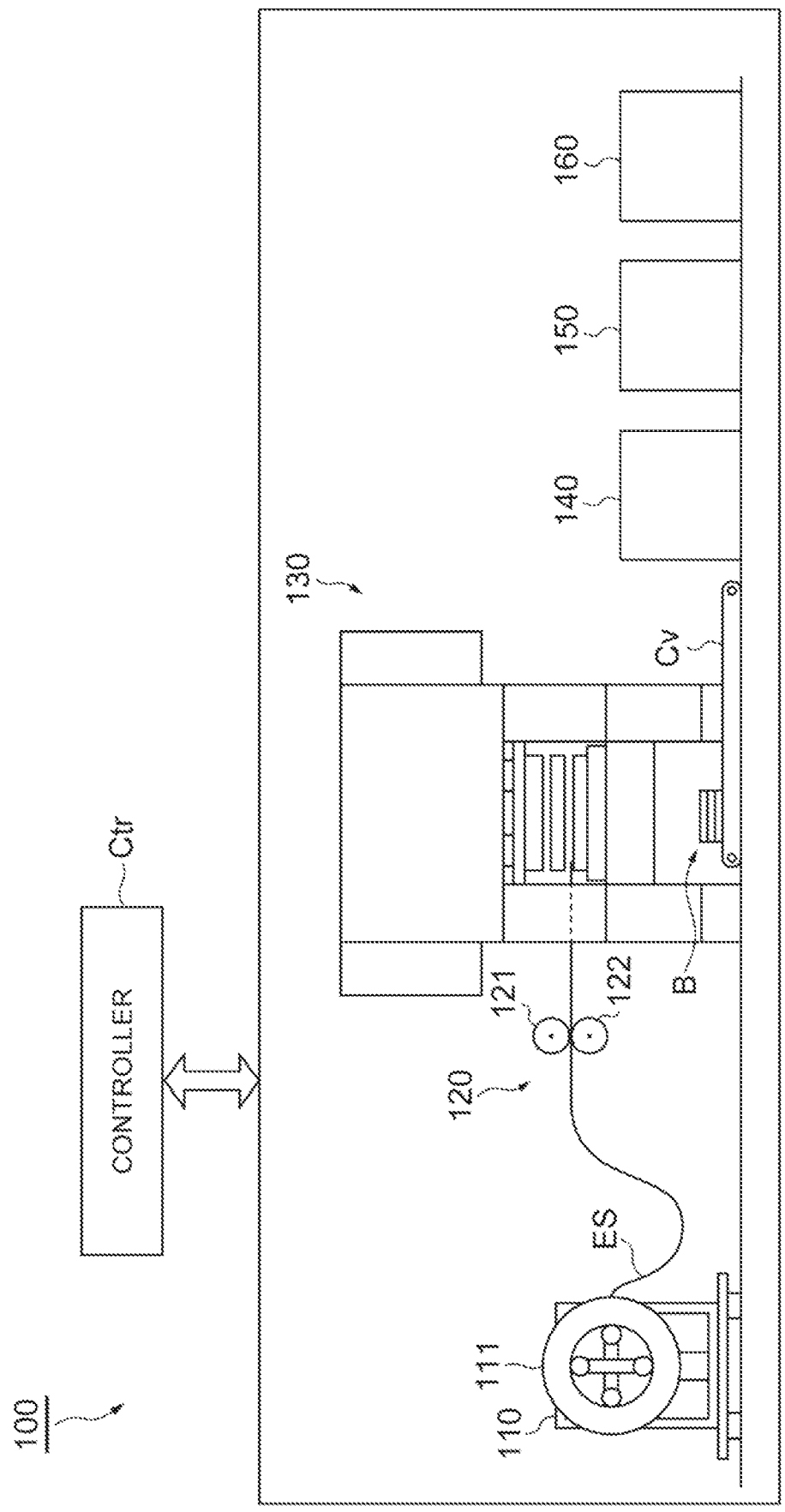
FIG. 4 is a schematic view showing an example of a rotor manufacturing device.

The block B is a stack in which a plurality of blanked members W are stacked, as shown in FIGS. 2 and 3. The blanked member W is a plate-like body obtained by blanking an electrical steel sheet ES into a predetermined shape and has a shape corresponding to the stack 10.

The blanked members W adjacent to each other in the stacking direction are fastened by connecting tab portions 18. The blocks B adjacent to each other in the stacking direction are not fastened by the connecting tab portion 18. Specifically, as shown in FIG. 2, the connecting tab portions 18 include connecting tabs 20 formed on blanked members W that are not the lowermost layer of the block B and through holes 22 formed in the blanked member W that is the lowermost layer of the block B. The connecting tab 20 includes a depression formed on the front surface of the blanked member W and a projection formed on the back surface of the blanked member W. The depression of the connecting tab 20 of one blanked member W is joined to a projection of the connecting tab 16a of another blanked member W that is adjacent to the surface of the one blanked member W. The projection of the connecting tab 20 of one blanked member W is joined to the depression the connecting tab 20 of another blanked member W adjacent to the back surface side of the one blanked member W. A projection of the connecting tab 20 of the blanked member W adjacent to the lowermost layer of the stacked rotor core 2 is joined to the through hole 22. The through hole 22 has a function of preventing the block B to be manufactured next from being fastened by the connecting tab 20 with respect to the already manufactured block B when the blocks B are continuously manufactured.

These blanked members W may be fastened by various known methods instead of the connecting tab portion 18. For example, the plurality of blanked members W may be joined to each other by using an adhesive or a resin material or may be joined to each other by welding. Otherwise, a temporarily-connecting tab may be provided on the blanked member W, the plurality of blanked members W may be fastened via the temporarily-connecting tab to obtain the stack 10, and then the temporarily-connecting tab may be removed from the stack. The "temporarily-connecting tab" means a connecting tab that is used to temporarily integrate the plurality of blanked members W and is removed in the process of manufacturing the stacked rotor core 2.

As shown in FIG. 1, the stack 10 has a cylindrical shape. A shaft hole 10a penetrating the stack 10 is provided in the center of the stack 10 so as to extend along the central axis Ax. That is, the shaft hole 10a extends in the stacking direction of the stack 10. The stacking direction is also the extending direction of the central axis Ax. In the present example, the stack 10 rotates about the central axis Ax, and thus the central axis Ax is also a rotational axis.

As shown in FIG. 2, in the present example, in each block B, the shaft hole 10a linearly obliquely extends along a predetermined direction. However, as a result of connecting the shaft holes 10a of the respective blocks B to each other, the shaft hole 10a of the stack 10 as a whole is bent. That is, the shaft hole 10a as a whole has a non-linear shape.

In the stack 10, a plurality of magnet insert holes 16 (through holes) are formed. As shown in FIGS. 1 and 3, the magnet insert holes 16 are arranged at predetermined intervals along the outer peripheral edge of the stack 10. As shown in FIG. 2, the magnet insert hole 16 penetrates the stack 10 so as to extend along the central axis Ax. That is, the magnet insert hole 16 extends in the stacking direction. Similarly to the shaft hole 10a, the magnet insert hole 16 extends in a straight line obliquely along a predetermined direction in each block B, but has a non-linear shape as a whole.

The shape of the magnet insert hole 16 is a long hole extending along the outer peripheral edge of the stack 10 in the present example. The number of magnet insert holes 16 is six in the present example. The positions, the shapes, and the number of the magnet insert holes 16 may be changed according to the use and the required performance of the motor, and the like.

As shown in FIGS. 1 and 2, the permanent magnets 12 are inserted into each magnet insert hole 16 one by one. The shape of the permanent magnet 12 is not particularly limited, but has a rectangular parallelepiped shape in the present example. The type of the permanent magnet 12 may be determined according to the use of the motor, the required performance, and the like. For example, the permanent magnet may be a sintered magnet or a bonded magnet.

The solidified resin 14 is obtained by filling the magnet insert hole 16 with the molten resin material (molten resin) after the permanent magnet 12 is inserted and then solidifying the molten resin. The solidified resin 14 has a function of fixing the permanent magnet 12 in the magnet insert hole 16 and a function of joining the blanked members W (blocks B) adjacent in the stacking direction (vertical direction). Examples of the resin material forming the solidified resin 14 include a thermosetting resin and a thermoplastic resin. Specific examples of the thermosetting resin include a resin composition including an epoxy resin, a curing initiator, and an additive. Examples of the additive include a filler, a flame retardant, and a stress reducing agent.

As shown in FIGS. 1 and 2, the shaft member 3 includes a shaft 3a and a flange 3b. The shaft 3a has a cylindrical shape. The tip portion of the shaft 3a (the portion extending upward from the flange 3b) is inserted into the shaft hole 10a of the stacked rotor core 2.

Figure 5:
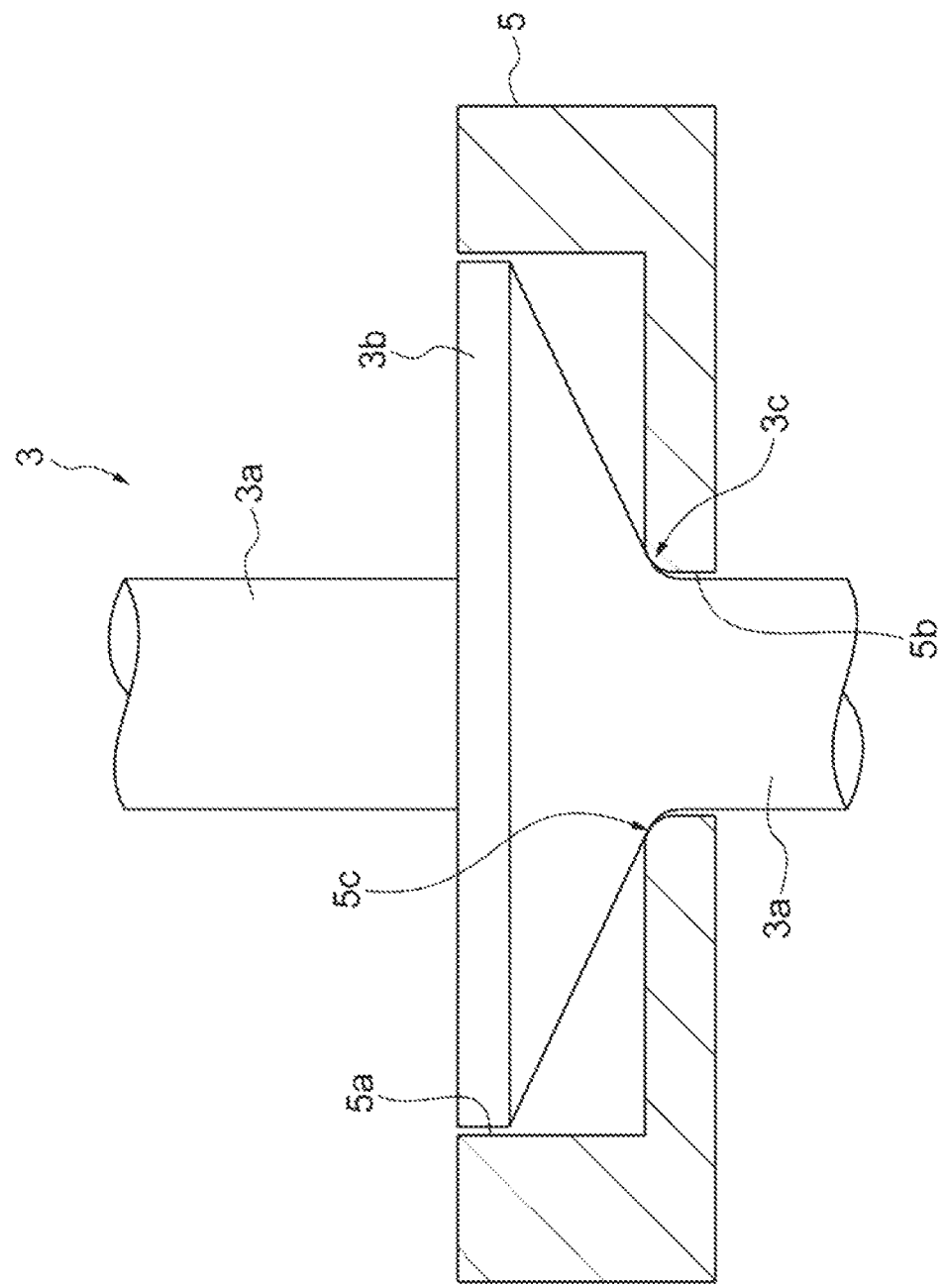
FIG. 5 is a cross-sectional view for describing a state in which a shaft member is held by a jig.

The flange 3b has a disk shape and is provided on the shaft 3a to project outward in the radial direction of the shaft 3a. The flange 3b has a function of holding the stacked rotor core 2 into which the shaft 3a is inserted. That is, a lower end face S1 of the stack 10 is in contact with the upper surface of the flange 3b. The diameter of the lower portion of the flange 3b is reduced toward the base portion (a portion extending downward from the flange 3b) of the shaft 3a and has a truncated cone shape as a whole. The neck 3c (the portion between the lower portion of the flange 3b and the base portion of the shaft 3a) of the flange 3b has a depressed curved surface as shown in FIG. 5.

In the present example, the outer diameter of the flange 3b is set to be approximately the same as the outer diameter of the stack 10. Therefore, when the stacked rotor core 2 is held by the flange 3b, the lower end of the magnet insert hole 16 overlaps the flange 3b and is closed by the flange 3b.

The end face plate 4 is a plate-like body having an annular shape provided with a through hole 4a in the center. The end face plate 4 is placed on an upper end face S2 of the stack 10 in a state in which the shaft 3a is inserted through the through hole 4a. The end face plate 4 may be joined to and integrated with the stack 10. The end face plate 4 may be configured with, for example, stainless steel or aluminum.

The outer diameter of the end face plate 4 is set to be approximately the same as the outer diameter of the stack 10. Therefore, when the end face plate 4 is held on the stacked rotor core 2, the upper end of the magnet insert hole 16 overlaps the end face plate 4 and is closed by the end face plate 4.

Manufacturing Device of a Rotor

Subsequently, the manufacturing device 100 of the rotor 1 is described with reference to FIGS. 4 to 9.

The manufacturing device 100 is a device of manufacturing the rotor 1 from the electrical steel sheet ES (workpiece plate) which is a belt-like metal plate. The manufacturing device 100 includes an uncoiler 110, a feed device 120, a blanking device 130, a pressing device 140, a magnet attaching device 150, a welding device 160, and a controller Ctr (control unit).

The uncoiler 110 rotatably holds a coil material 111 in a state in which the coil material 111 which is a strip-shaped electrical steel sheet ES wound in a coil shape is mounted. The feed device 120 includes a pair of rollers 121 and 122 that sandwich the electrical steel sheet ES from above and below. The pair of rollers 121 and 122 rotate and stop based on an instruction signal from the controller Ctr, and intermittently sequentially feed the electrical steel sheet ES toward the blanking device 130.

The blanking device 130 operates based on an instruction signal from the controller Ctr. The blanking device 130 has a function of sequentially blanking the electrical steel sheets ES intermittently fed by the feed device 120 to form a blanked member W and a function of sequentially stacking the blanked members W obtained by the blanking processing to manufacture the block B.

When the block B is discharged from the blanking device 130, the block B is placed on a conveyor Cv provided to extend between the blanking device 130 and the pressing device 140. The conveyor Cv operates based on an instruction from the controller Ctr, and sends the block B to the pressing device 140. The block B may be conveyed by means other than the conveyor Cv between the blanking device 130 and the pressing device 140. For example, the block B may be manually conveyed by a human operator in a state of being placed in a container.

The pressing device 140 operates based on an instruction signal from the controller Ctr. The pressing device 140 has a function of pressing the plurality of blocks B held by the shaft member 3. In the pressing device 140, the shaft member 3 is held by a jig 5, as shown in FIG. 5.

The jig 5 is a plate-like body and includes a depression 5a and a through hole 5b. The depression 5a has a shape corresponding to the outer shape of the flange 3b, and has a substantially circular shape when viewed from above. The inner diameter of the depression 5a is set to be slightly larger than the outer diameter of the flange 3b.

The through hole 5b is provided in the center of the depression 5a. That is, the through hole 5b extends from the bottom surface of the depression 5a to the lower surface of the jig 5. The through hole 5b has a shape corresponding to the outer shape of the base portion of the shaft 3a, and has a substantially circular shape when viewed from above. The diameter of the through hole 5b is set to be slightly larger than the outer diameter of the base portion of the shaft 3a.

An upper end edge Sc of the through hole 5b is connected to the bottom surface of the depression 5a while being curved. Therefore, the upper end edge 5c has a projecting curved surface. The curvature of a part of the upper end edge Sc is substantially the same as the curvature of a part of the neck 3c. Therefore, when the base portion of the shaft 3a is inserted into the through hole 5b, the portions where the curvatures of the neck 3c and the upper end edge 5c substantially the same with each other are in contact with each other, but the base portion of the shaft 3a is not in contact with the through hole 5b, and the flange 3b is not in contact with the depression 5a. Accordingly, the shaft member 3 is positioned on the jig 5 so that the shaft 3a extends along the vertical direction.

Figure 6:
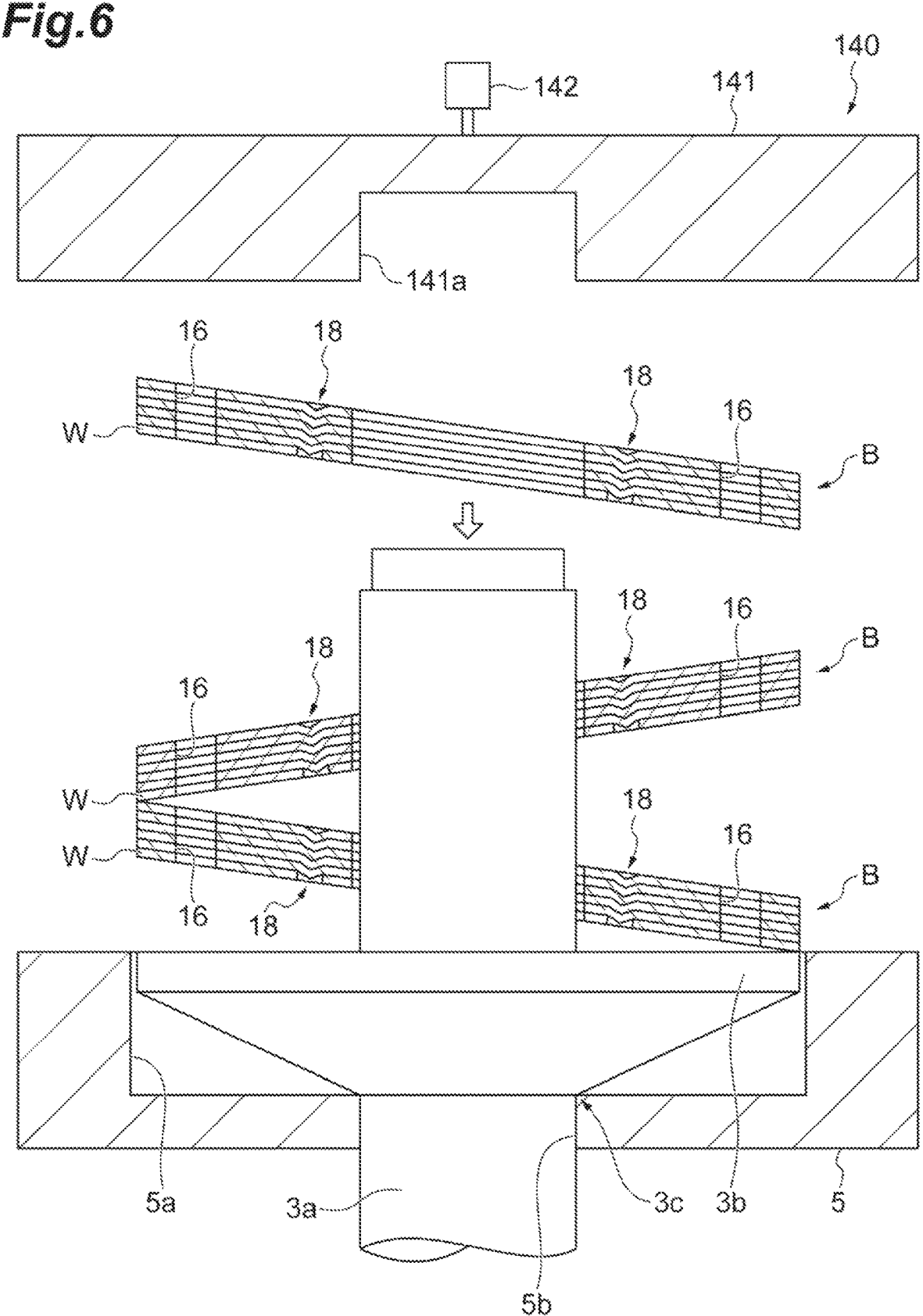
FIG. 6 is a cross-sectional view for describing a state in which blocks are mounted to a shaft by a pressing device.
Figure 7:
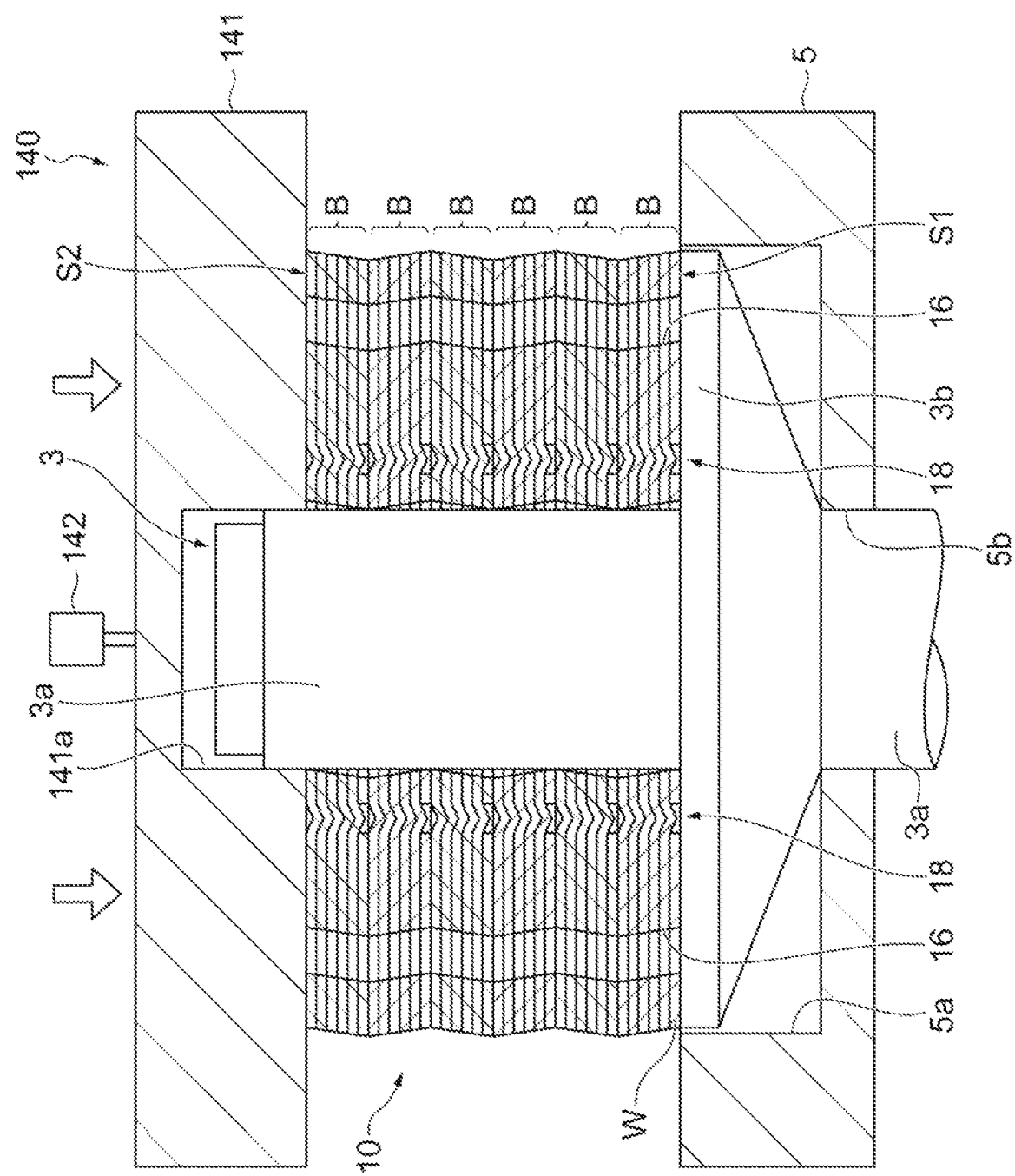
FIG. 7 is a cross-sectional view for describing a step subsequent to FIG. 6.

As shown in FIGS. 6 and 7, the pressing device 140 includes a sandwiching member 141 and an elevating mechanism 142. The sandwiching member 141 is positioned above the flange 3b and the upper surface of the jig 5 to face to the flange 3b and the upper surface of the jig 5. The sandwiching member 141 is a plate-like body and includes a depression 141a. The depression 141a is provided in the center of the lower surface of the sandwiching member 141. The depression 141a has a shape corresponding to the outer shape of the tip portion of the shaft 3a and has a substantially circular shape when viewed from below. The inner diameter of the depression 141a is set to be slightly larger than the outer shape of the tip portion of the shaft 3a.

The elevating mechanism 142 is connected to the sandwiching member 141. The elevating mechanism 142 operates based on an instruction from the controller Ctr, and reciprocates the sandwiching member 141 in the vertical direction. That is, the elevating mechanism 142 is configured to move the sandwiching member 141 up and down to bring the sandwiching member 141 close to and away from the flange 3b and the jig 5. The elevating mechanism 142 is not particularly limited as long as the elevating mechanism moves the sandwiching member 141 up and down, and may be, for example, an actuator or an air cylinder.

In order to fit the plurality of blocks B to the tip portion of the shaft 3a (see FIG. 6), the elevating mechanism 142 retracts the sandwiching member 141 upward. Meanwhile, in order to press the plurality of blocks B fitted to the tip portions of the shaft 3a (see FIG. 7), the elevating mechanism 142 lowers the sandwiching member 141 toward the plurality of blocks B and the flange 3b. At this time, the tip portion of the shaft 3a is accommodated in the depression 141a of the sandwiching member 141, so that the shaft 3a does not hinder the downward movement of the sandwiching member 141.

Figure 8:
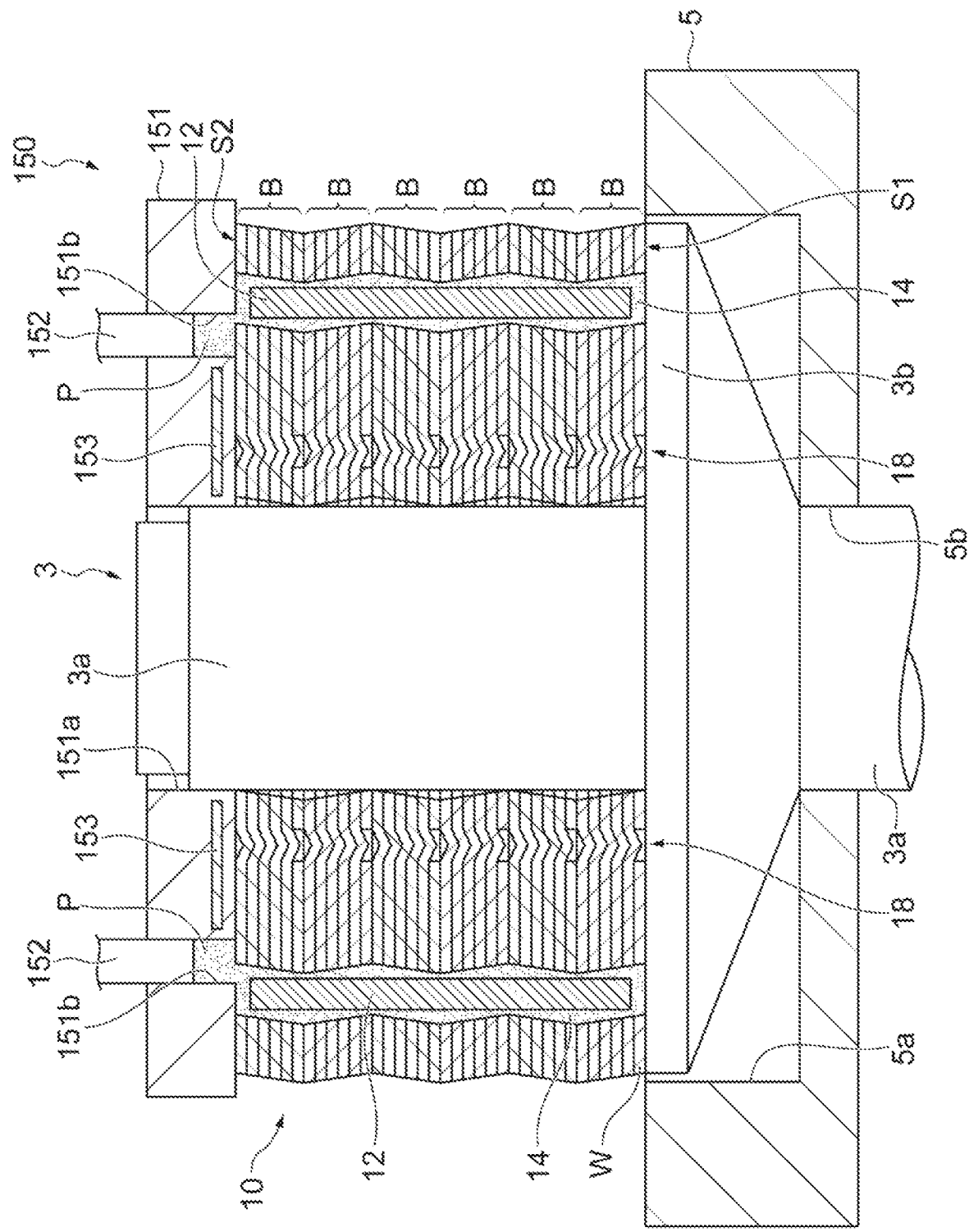
FIG. 8 is a cross-sectional view for describing a state in which permanent magnets are mounted to magnet insert holes of the stack by a magnet attaching device.

The magnet attaching device 150 operates based on an instruction signal from the controller Ctr. The magnet attaching device 150 has a function of inserting the permanent magnet 12 into each magnet insert hole 16 and a function of filling the magnet insert hole 16 into which the permanent magnet 12 is inserted, with the molten resin. As shown in FIG. 8, the magnet attaching device 150 includes an upper die 151, a plurality of plungers 152, and a built-in heat source 153.

The upper die 151 is configured to sandwich the stack 10 in the stacking direction (the height direction of the stack 10) together with the flange 3b of the shaft member 3. When the upper die 151 sandwiches the stack 10 together with the flange 3b, a predetermined load is applied to the stack 10 from the stacking direction.

The upper die 151 is a plate-like member having a rectangular shape. The upper die 151 is provided with one through hole 151a and a plurality of accommodation holes 151b. The through hole 151a is located in a substantially central portion of the upper die 151. The through hole 151a has a shape (substantially circular) corresponding to the shaft 3a, and the tip portion of the shaft 3a can be inserted into the through hole 151a.

The plurality of accommodation holes 151b penetrate the upper die 151 and are arranged at predetermined intervals along the periphery of the through hole 151a. Each accommodation hole 151b is located at a position corresponding to each of the magnet insert holes 16 of the stack 10 when the flange 3b and the upper die 151 sandwich the stack 10. Each accommodation hole 151b has a cylindrical shape and has a function of accommodating at least one resin pellet P.

The plurality of plungers 152 are located above the upper die 151. Each plunger 152 is configured to be inserted into and removed from the corresponding accommodation hole 151b by a drive source (not shown).

The built-in heat source 153 is, for example, a heater and is built in the upper die 151. When the built-in heat source 153 operates, the upper die 151 is heated, the stack 10 that is in contact with the upper die 151 is heated, and the resin pellet P accommodated in each accommodation holes 151b is heated. Accordingly, the resin pellet P melts and changes to a molten resin.

Figure 9:
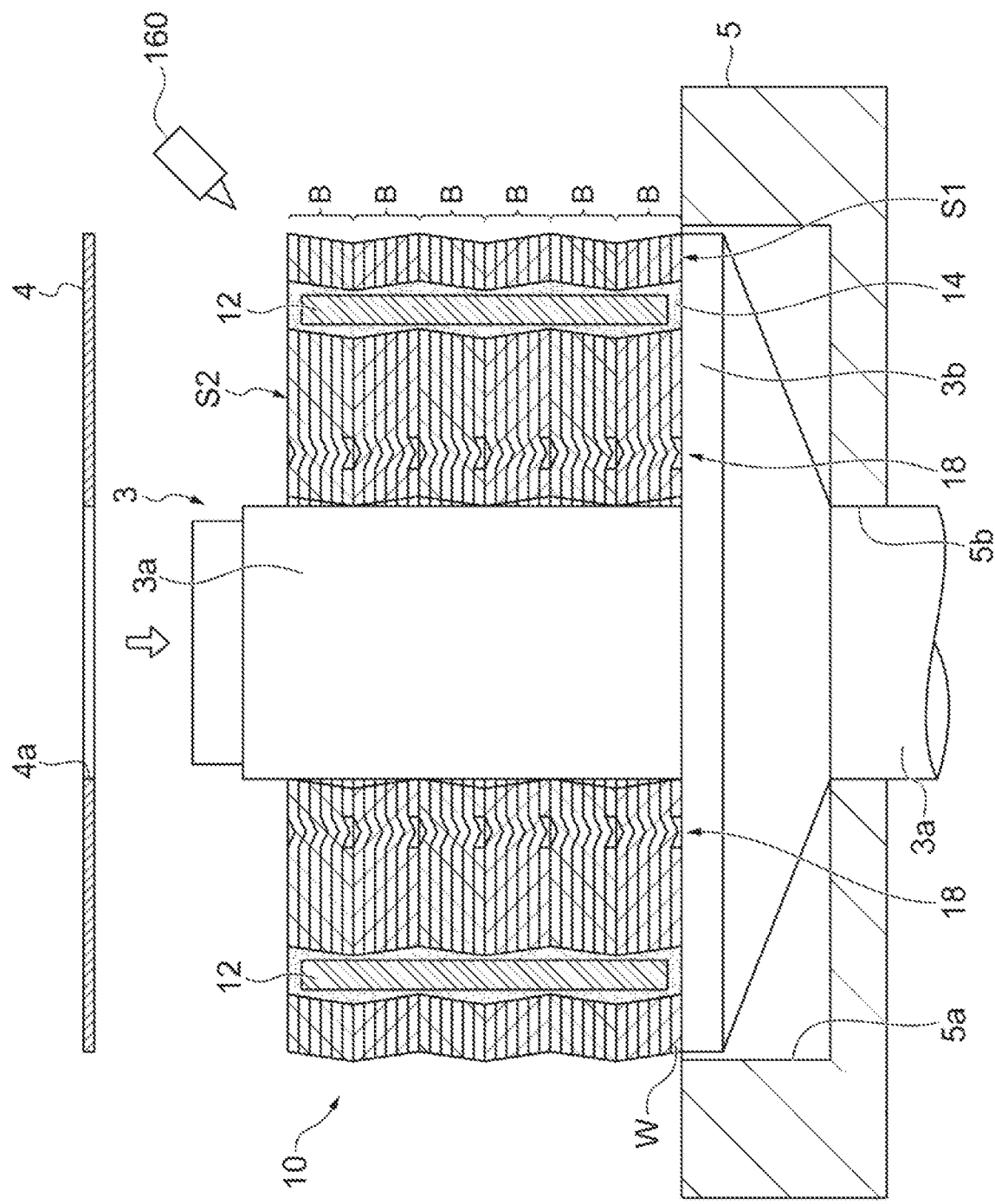
FIG. 9 is a cross-sectional view for describing a state in which an end face plate is joined to a stacked rotor core by a welding device.

The welding device 160 operates based on an instruction signal from the controller Ctr. The welding device 160 has a function of welding the stacked rotor core 2 and the end face plate 4. As shown in FIG. 9, the welding device 160 may be a welding torch.

Among the pressing device 140, the magnet attaching device 150, and the welding device 160, the stack 10 or the stacked rotor core 2 held by the shaft member 3 is conveyed in a state in which the shaft member 3 is held by the jig 5. At this time, the stack 10 or the stacked rotor core 2 may be conveyed by a conveyor (not shown) together with the jig 5 via the shaft member 3 or may be manually conveyed by a human operator in a state of being placed on the container.

The controller Ctr, based on, for example, a program recorded in a recording medium (not shown), an operation input from an operator, or the like, generates an instruction signal for operating each of the feed device 120, the blanking device 130, the pressing device 140, the magnet attaching device 150, and the welding device 160, and transmits the corresponding instruction signal thereto.

[Method of Manufacturing a Rotor]

Subsequently, with reference to FIGS. 4 to 10, a method of manufacturing the rotor 1 is described. First, while sequentially blanking the electrical steel sheets ES by the blanking device 130, the blanked members W are stacked, to sequentially form the blocks B (see step S11 in FIG. 10). Accordingly, the block B in which the shaft hole 10a, the magnet insert holes 16, and the connecting tab portions 18 are formed is obtained. At this time, the inner diameter of the shaft hole 10a of the block B is set larger than the outer diameter of the shaft 3a.

At this time, when the blanked member W is blanked from the electrical steel sheets ES, the blanked member W is distorted, and the blanked member W does not become flat but may be slightly curved. Generally, the thickness of the electrical steel sheet ES is not completely uniform and slightly varies. Therefore, the shaft hole 10a and the magnet insert hole 16 of the block B can be in an extending state obliquely to the height direction of the block B. In each figure, the inclination is greatly exaggerated, but is actually about several tens of μm.

Subsequently, each block B is conveyed to the pressing device 140, and the plurality of blocks B are mounted to the shaft member 3 held by the jig 5 one by one. Specifically, first, based on an instruction from the controller Ctr, the elevating mechanism 142 raises the sandwiching member 141, and thus the sandwiching member 141 is in a state of being separated from the shaft member 3 and the jig 5.

Figure 10:
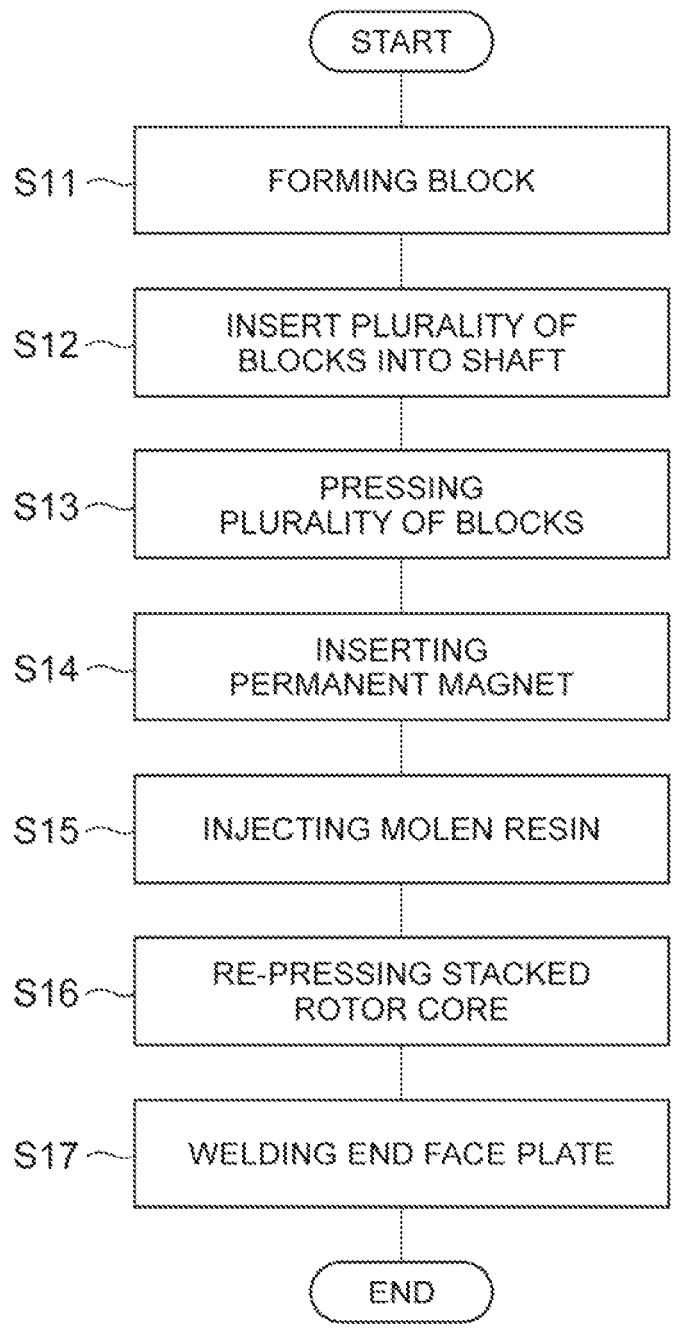
FIG. 10 is a flowchart for describing an example of a method of manufacturing a rotor.

Subsequently, the blocks B are fitted to the shaft 3a one by one such that the tip portion of the shaft 3a is in a state of being inserted into the shaft hole 10a of the block B (see step S12 in FIG. 10).

Since the inner diameter of the shaft hole 10a of the block B is larger than the outer diameter of the shaft 3a, the block B is smoothly fitted without being caught by the shaft 3a. At this time, since the shaft hole 10a of the block B extends along the extending direction of the shaft 3a, the block B itself is oblique to the shaft 3a (see FIG. 6). Particularly, when the plurality of blocks B are fitted to the shaft 3a while rotationally stacking, the inclination of the blocks B is alternately reversed as shown in FIG. 6.

Subsequently, as shown in FIG. 7, based on an instruction from the controller Ctr, the elevating mechanism 142 lowers the sandwiching member 141 and presses the plurality of blocks B fitted to the shaft 3a (see step S13 of FIG. 10). The load at this time may be, for example, about 5 to 10 tons.

Accordingly, the plurality of blocks B are sandwiched between the flange 3b and the sandwiching member 141, and the block B itself horizontally extends along the upper surface of the flange 3b and the lower surface of the sandwiching member 141. Meanwhile, the shaft hole 10a and the magnet insert hole 16 are in a state of being inclined to the shaft 3a. Therefore, the shaft hole 10a is bent as a whole (non-linear shape), and accordingly, the inner peripheral edge of the shaft hole 10a bites at the shaft 3a. Therefore, since the plurality of blocks B are engaged with the shaft 3a, even if the sandwiching member 141 rises and is separated from the block B, the plurality of blocks B hardly spread outward. Thus, the gaps between the plurality of blocks B can be reduced, and the stack 10 in which the plurality of blocks B are stacked is configured on the flange 3b.

Subsequently, the stack 10 is conveyed to the magnet attaching device 150 together with the shaft member 3 and the jig 5. Subsequently, the permanent magnets 12 are inserted into each magnet insert hole 16 (see step S14 in FIG. 10). Insertion of the permanent magnets 12 into each magnet insert hole 16 may be performed manually by a human operator or may be performed by a robot hand (not shown) provided in the magnet attaching device 150 based on an instruction from the controller Ctr.

Subsequently, the upper die 151 is placed on the stack 10, and the stack 10 is pressed by the upper die 151. The load at this time may be, for example, about 1 to 10 tons. Thereby, the stack 10 is sandwiched between the upper die 151 and the flange 3b in the stacking direction. Subsequently, the resin pellet P is put into each accommodation hole 151b. If the resin pellet P is in a molten state by the built-in heat source 153 of the upper die 151, the molten resin is injected into each magnet insert hole 16 by the plunger 152. At this time, the stack 10 may be heated to, for example, about 150° C. to 180° C. by the built-in heat source 153.

Thereafter, when the molten resin is solidified, the solidified resin 14 is formed in the magnet insert hole 16. Thus, the respective blocks B are integrated by the solidified resin 14, and the permanent magnets 12 are mounted to the stack 10 (see step S15 in FIG. 10). If the upper die 151 is removed from the stack 10, the stacked rotor core 2 is completed on the flange 3b.

Subsequently, the stacked rotor core 2 is conveyed to the pressing device 140 together with the shaft member 3 and the jig 5. Subsequently, based on an instruction from the controller Ctr, the elevating mechanism 142 lowers the sandwiching member 141 and re-presses the stacked rotor core 2 mounted to the shaft 3a (see step S16 in FIG. 10). The load at this time may be, for example, about 1 to 10 tons. Thereby, the stacked rotor core 2 is pressed against the flange 3b, and the lower end face S1 of the stacked rotor core 2 comes into contact with the upper surface of the flange 3b.

Subsequently, the stacked rotor core 2 is conveyed to the welding device 160 together with the shaft member 3 and the jig 5. Subsequently, the end face plate 4 is placed on the upper end face S2 of the stacked rotor core 2 while the through hole 4a of the end face plate 4 is fitted to the tip portion of the shaft 3a. Subsequently, the welding device 160 operates based on an instruction from the controller Ctr to weld between the end face plate 4 and the stack 10 (see step S17 in FIG. 10). Accordingly, a rotating body in which the end face plate 4 is joined to the stacked rotor core 2 is configured. Thereafter, the rotor 1 is completed by removing the shaft member 3 from the jig 5.

In the present example as described above, the shaft 3a is not mounted to the stack 10 after the plurality of blocks B are stacked to form the stack 10, but the plurality of blocks B are pressed after each of the plurality of blocks B is mounted to the shaft 3a. Since the inner diameter of the shaft hole 10a of the block B is larger than the outer diameter of the shaft 3a, the shaft 3a is easily inserted into the individual blocks B. Meanwhile, if the plurality of blocks B are pressed, the shaft hole 10a of the stack 10 as a whole becomes non-linear, the inner peripheral edge of the shaft hole 10a bites at the shaft 3a and the plurality of blocks B are engaged with the shaft 3a. Therefore, since the plurality of blocks B are mounted to the shaft 3a simply by pressing the plurality of blocks B through which the shaft 3a is inserted, the rotor 1 can be simply and efficiently manufactured.

In the present example, the fitting of the plurality of blocks B to the shaft 3a and the pressing to the plurality of blocks B may be performed in an ambient temperature environment. In this case, compared with a case where the shaft 3a is mounted to the stacked rotor core 2 by shrink fitting, the heat treatment and the cooling treatment of the stack 10 are not required. Therefore, the rotor 1 can be manufactured more efficiently and in a short period of time. In the present specification, "ambient temperature" refers to a temperature in a state in which neither the external diameter is heated nor cooled, and more specifically, the room temperature of a place (factory) where the rotor 1 is manufactured.

In the present example, the plurality of blocks B are placed on the flange 3b provided on the shaft 3a when fitted to the shaft 3a. Therefore, the plurality of blocks B can be easily positioned to the shaft 3a, and simultaneously the pressure when the plurality of blocks B are pressed can be received by the flange 3b.

In the present example, the shaft 3a is positioned to extend along the vertical direction by holding the flange 3b by the jig 5. Therefore, the plurality of blocks B are easily positioned through the shaft 3a from above. Accordingly, the manufacture efficiency can be further improved.

In the present example, the stacked rotor core 2 is formed by providing the permanent magnets 12 and the solidified resin 14 in the magnet insert hole 16, and then the stacked rotor core 2 is re-pressed by the pressing device 140. Therefore, the stacked rotor core 2 comes into contact with the flange 3b. Accordingly, a gap is hardly formed between the stacked rotor core 2 and the flange 3b, and the stacked rotor core 2 hardly moves relative to the shaft 3a. As a result, when the electric motor (motor) configured by using the completed rotor 1 operates, the rattling of the rotor 1 can be suppressed.

In the present example, the stack 10 is pressed in the height direction and the molten resin is injected into the magnet insert hole 16, thus the plurality of blocks B are integrated to form the stacked rotor core 2. Therefore, the molten resin injected into the magnet insert hole 16 is solidified, and thus the plurality of blocks B can be fastened by the solidified resin 14. Further, in the process of injecting the molten resin into the magnet insert hole 16 and solidifying the molten resin, the stack 10 can be pushed and expanded around the magnet insert hole 16 by the resin, to narrow down the shaft hole 10a. Therefore, the inner peripheral edge of the shaft hole 10a more firmly bites the shaft 3a. Therefore, a plurality of blocks B can be more reliably mounted to the shaft 3a.

In the present example, the plurality of blocks B are held by the flange 3b to cover the lower end of the magnet insert hole 16 with the flange 3b, and the end face plate 4 is mounted to the upper end face S2 of the stack 10 to cover the upper end of the magnet insert holes 16. Therefore, the magnet insert hole 16 is covered with the flange 3b, and the flange 3b exhibits a function of blocking the molten resin injected into the magnet insert hole 16. Therefore, it is not required to mount end face plate 4 to the lower end face S1 of the stack 10 facing the flange 3b. As a result, the rotor 1 can be simply and efficiently manufactured.

In the present example, the blocks B in which the plurality of blanked members W blanked from the electrical steel sheet ES are stacked are further stacked to obtain the stack 10. Therefore, the shaft hole 10a as the whole stack 10 obtained by pressing the plurality of blocks B more tends to bend. Therefore, the inner peripheral edge of the shaft hole 10a more firmly bites the shaft 3a. As a result, the plurality of blocks B can be more reliably mounted to the shaft 3a.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

The block B may be configured by rotationally stacking the plurality of blanked members W.

In the above example, the stack 10 is obtained by stacking the plurality of blocks B, but the stack 10 may be obtained by stacking the plurality of blanked members 30. That is, the blanked members W are fitted to the shaft 3a one by one, and then the plurality of blanked members W may be pressed by the pressing device 140. Also at this time, the plurality of blanked members W may be stacked by rotational stacking.

In the above example, the plurality of blocks B are rotationally stacked, but the plurality of blocks B may be stacked without rotational stacking. Even in this case, the shaft hole 10a of the stack 10 is bent as a whole (non-linear), and thus the plurality of blocks B can be mounted to the shaft 3a only by pressing the plurality of blocks B by the pressing device 140.

Figure 11:
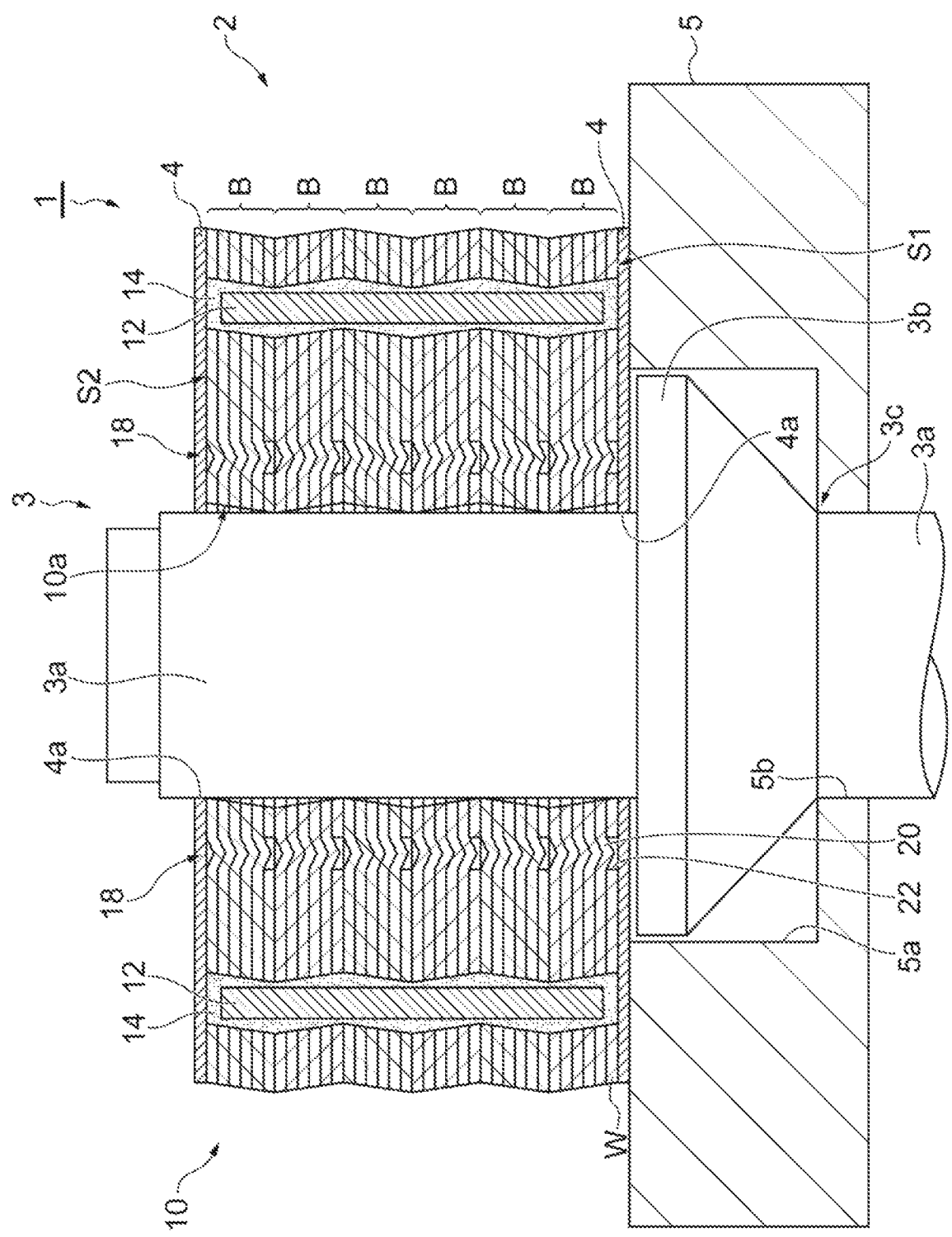
FIG. 11 is a cross-sectional view for describing another example of the method of manufacturing a rotor.

The upper surface of the flange 3b and the upper surface of the jig 5 may substantially identical to each other. When the outer diameter of the flange 3b is approximately the same as the outer diameter of the stack 10, the upper surface of the flange 3b may be higher or lower than the upper surface of the jig 5. As shown in FIG. 11, when the outer diameter of the flange 3b is smaller than the outer diameter of the stack 10, and the magnet insert hole 16 of the stack 10 is closed by the end face plate 4 disposed on the lower end face S1 side of the stack 10, the upper surface of the flange 3b may be lower than the upper surface of the jig 5. In this case, the molten resin injected into the magnet insert hole 16 is blocked by the jig 5, to form the stacked rotor core 2. Then, when the stacked rotor core 2 is re-pressed by the pressing device 140, the gap between the stacked rotor core 2 and the flange 3b is suppressed.

When the stacked rotor core 2 is obtained, if the stacked rotor core 2 is in contact with the flange 3b, the stacked rotor core 2 may not be re-pressed by the pressing device 140.

Figure 12:
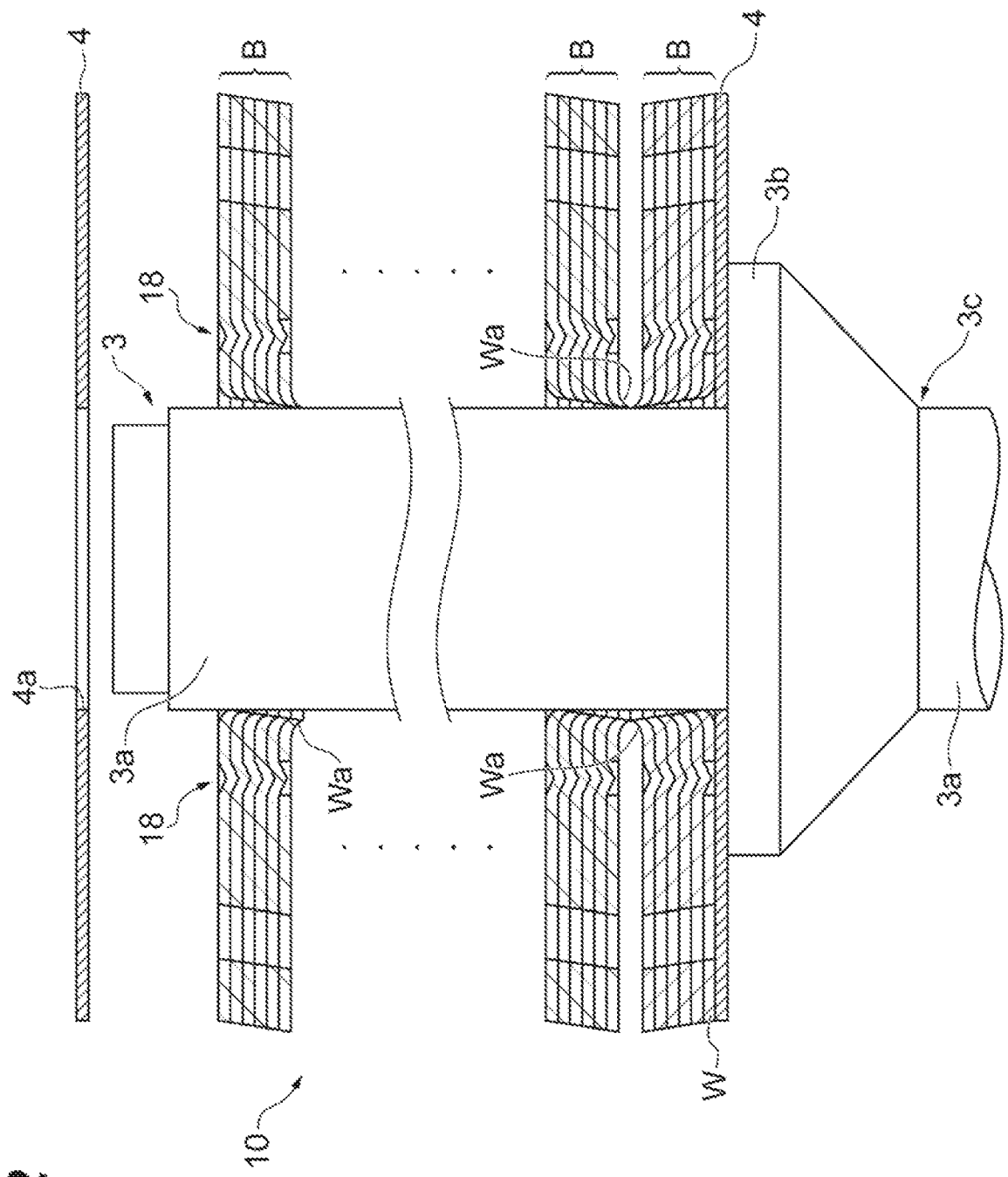
FIG. 12 is a cross-sectional view for describing another example of the method of manufacturing a rotor.

In the process of obtaining the blanked member W by blanking the electrical steel sheet ES by punching, burrs Wa may occur at the inner peripheral edge of the shaft hole 10a of the blanked member W as shown in FIG. 12. When the shaft 3a is to be mounted to the stacked rotor core 2 by shrink fitting, in order to prevent the shaft 3a from being caught by the burr Wa of the shaft hole 10a, the plurality of blocks B are stacked such that the burrs Wa of the shaft hole 10a protrude toward one side in the insertion direction of the shaft 3a. Therefore, the burr Wa protrudes from one end face of the stack 10, and the end face plate 4 may hardly be in contact with the end face. Therefore, as shown in FIG. 12, in the blocks B positioned at both ends at least in the height direction, the plurality of blocks B may be mounted to the shaft 3a such that the burrs Wa formed on the peripheral edge portion of the shaft hole 10a are directed inwardly. In this case, the inner diameter of the shaft hole 10a of the block B is larger than the outer diameter of the shaft 3a, and thus even if the burrs Wa are present in the shaft hole 10a, the shaft 3a can be easily inserted into each block B. Therefore, the plurality of blocks B are mounted to the shaft 3a such that the burrs Wa of the shaft hole 10a are directed inwardly, and thus the end face plate 4 can be more easily mounted to each end face S1 and S2 of the stack 10.

Figure 13:
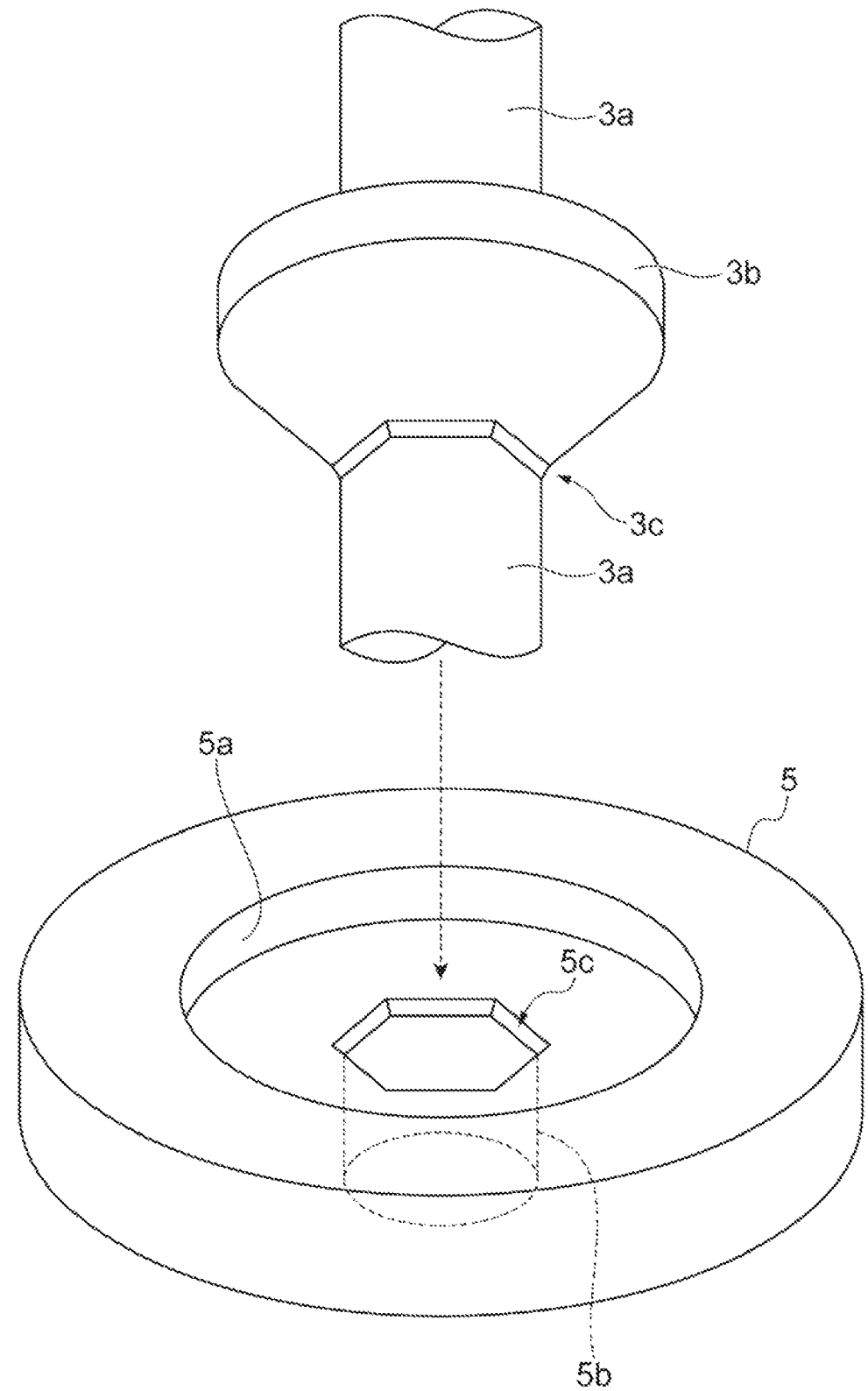
FIG. 13 is a perspective view for describing another example of the jig and the shaft member.

As shown in FIG. 13, the neck 3c of the flange 3b may have a polygonal shape, and the upper end edge Sc of the through hole 5b may have a polygonal shape corresponding to the neck 3c. In this case, the shaft 3a is positioned in regard to the rotation axis thereof. Accordingly, the dislocation of the plurality of blocks B around the rotation axis of the shaft 3a accompanying the rotation of the shaft 3a can be suppressed. If the shaft 3a can be positioned in regard to the rotation axis thereof, rotation stopping means is not limited to the neck 3c and the upper end edge 5c as shown in FIG. 13, and various dislocation suppressing means can be employed.

An example method of manufacturing a rotor may include: mounting a plurality of core members to a shaft in a state by inserting the shaft into a shaft hole that penetrates through the plurality of core members in a height direction, an inner diameter of the shaft hole being larger than an outer diameter of the shaft; and pressing the plurality of stacked core members together in the height direction to form a stack in which the plurality of core members are located adjacent to each other, and the shaft hole is engaged with the shaft. In this case, the shaft is not mounted to the stack after a plurality of core members are stacked to form a stack, but the plurality of core members are pressed after the plurality of core members are mounted to the shaft. Therefore, since the inner diameter of the shaft hole of the core member is larger than the outer diameter of the shaft, the shaft is easily inserted into each individual core member. Meanwhile, if the plurality of core members are pressed, the shaft hole as a whole of the stack becomes non-linear, the inner peripheral edge of the shaft hole bites the shaft and thus the plurality of core members are engaged with the shaft. Therefore, simply by pressing the plurality of core members through which the shaft is inserted, the plurality of core members are mounted to the shaft, and thus the rotor can be simply and efficiently manufactured.

In some examples, mounting the plurality of core members to the shaft and pressing the plurality of stacked core members together to form the stack may be performed in an ambient temperature environment. In this case, compared with a case where the shaft is mounted to the stacked rotor core by shrink fitting, a heating treatment and a cooling treatment of the stack are not required. Therefore, the rotor can be manufactured more efficiently and in a short period of time.

In some examples, mounting the plurality of core members to the shaft may include placing the plurality of core members on a flange provided on the shaft. In this case, the plurality of core members with respect to the shaft can be easily positioned, and simultaneously the pressure when the plurality of core members are pressed can be received by the flange.

In some examples, the shaft may be positioned so as to extend along a vertical direction by holding the flange by a jig. In this case, the plurality of core members can be easily positioned through the shaft from above. For this reason, manufacturing efficiency can be further improved.

In some examples, the shaft may be positioned in regard to a rotation axis of the shaft by engaging the flange with a jig. In this case, the dislocation of the plurality of core members around the rotation axis of the shaft accompanying the rotation of the shaft can be suppressed.

An example method may further include integrating the plurality of core members comprising the stack to form a core main body; and pressing the core main body to be in contact with the flange. In this case, since a gap is hardly formed between the core main body and the flange, the core main body hardly moves relative to the shaft. Therefore, when the electric motor (motor) configured with the completed rotor operates, the rattling of the rotor can be suppressed.

An example method may further include pressing the stack in the height direction, injecting a molten resin into a through hole provided in the stack so as to extend in the height direction and integrating the plurality of core members comprising the stack to form a core main body. In this case, the molten resin injected into the through hole is solidified, such that the plurality of core members can be fastened with the solidified resin. Further, in the process of injecting the molten resin into the through hole and solidifying the molten resin, the stack is pushed and expanded around the magnet insert hole by the resin, to narrow down the shaft hole. Therefore, the inner peripheral edge of the shaft hole more firmly bites the shaft. Therefore, the plurality of core members can be more reliably mounted to the shaft.

An example method may further include mounting an end face plate to an end face of the core main body, in which mounting the plurality of core members to the shaft may include placing the plurality of core member to the flange to cover the through hole with the flange provided on the shaft; mounting the end face plate may include mounting the end face plate to the end face of the core main body such that the flange and the end face plate sandwich the core main body, and the end face plate may cover the through hole. In this case, since the flange covers the through hole, the flange exhibits a function of blocking the molten resin injected into the through hole. Therefore, it is not required to mount the end face plate to the end face of the core main body on the side facing the flange. Therefore, the rotor can be more simply and efficiently manufactured.

In some examples, mounting the plurality of core members to the shaft may include mounting the plurality of core members to the shaft such that in the core members located at both ends of the stack in the height direction, burrs formed on a peripheral edge of the shaft hole are directed inwardly. When the shaft is to be mounted to the stacked rotor core by shrink fitting, in order to prevent the shaft from being caught by the burr of the shaft hole, the plurality of core members are stacked such that the burrs of the shaft hole protrude toward one side in the insertion direction of the shaft. For this reason, the burrs protrude from one end face of the stack and the end face plate hardly comes into contact with the end face in some cases. However, in some examples, since the inner diameter of the shaft hole of each core member is larger than the outer diameter of the shaft, even if the burrs are present in the shaft hole, the shaft is easily inserted into the individual core members. Therefore, the plurality of core members are mounted to the shaft such that the burrs of the shaft hole are directed inwardly, and thus the end face plate can be more easily mounted to each end face of the stack.

In some examples, each of the plurality of core members may include a block in which a plurality of blanked members obtained by blanking a metal plate are stacked. In this case, the shaft hole as a whole of the stack obtained by pressing the plurality of blocks more tends to bend. Therefore, the inner peripheral edge of the shaft hole more firmly bites the shaft. Accordingly, the plurality of blocks can be more reliably mounted to the shaft.

We claim all modifications and variations coming within the spirit and scope of the subject matter claimed herein.

The invention claimed is:

1. A method of manufacturing a rotor, the method comprising:

mounting a plurality of core members to a shaft in a state where the shaft is inserted into a shaft hole of each of the plurality of core members along an extending direction of the shaft hole and where each of the plurality of core members is oblique to the shaft, the shaft hole penetrating through each of the plurality of core members in a height direction thereof and obliquely extending in the height direction, an inner diameter of the shaft hole being larger than an outer diameter of the shaft; and pressing the plurality of stacked core members together in the height direction to form a stack in which the plurality of core members are located adjacent to each other and the shaft hole is engaged with the shaft so that an inner peripheral edge of the shaft hole of each of the plurality of core members bites into the shaft by the pressing to align the shaft hole of each of the plurality of the core members, change an attitude of the shaft hole and give the shaft hole of the stack as a whole a non-linear shape.

2. The method according to claim 1, wherein mounting the plurality of core members to the shaft and pressing the plurality of stacked core members together to form the stack are performed in an ambient temperature environment.

3. The method according to claim 1, wherein mounting the plurality of core members to the shaft includes placing the plurality of core members on a flange provided on the shaft.

4. The method according to claim 3, wherein the shaft is positioned so as to extend along a vertical direction by holding the flange by a jig.

5. The method according to claim 3, wherein the shaft is positioned in regard to a rotational axis of the shaft by engaging the flange with a jig.

6. The method according to claim 3, further comprising:
integrating the plurality of core members comprising the stack to form a core main body; and
pressing the core main body to be in contact with the flange.

7. The method according to claim 1, further comprising:
pressing the stack in the height direction;
injecting a molten resin into a through hole provided in the stack so as to extend in the height direction; and
integrating the plurality of core members comprising the stack to form a core main body.

8. The method according to claim 7, further comprising:
mounting an end face plate to an end face of the core main body,
wherein mounting the plurality of core members to the shaft includes placing the plurality of core members to a flange provided on the shaft such that the flange covers the through hole; and
wherein mounting the end face plate includes mounting the end face plate to the end face of the core main body such that the flange and the end face plate sandwich the core main body, and the end face plate covers the through hole.

9. The method according to claim 1, wherein mounting the plurality of core members to the shaft includes mounting the plurality of core members to the shaft such that in the core members located at both ends of the stack in the height direction, burrs formed on a peripheral edge of the shaft hole are directed inwardly.

10. The method according to claim 1, wherein each of the plurality of core members includes a block in which a plurality of blanked members obtained by blanking a metal plate are stacked.

11. The method according to claim 10, wherein the mounting the plurality of core members to the shaft includes mounting the plurality of core members to the shaft while rotationally stacking such that inclinations of two adjacent core members of the plurality of core members are different from each other in a state where the shaft is inserted into the shaft hole of each of the plurality of core members.

12. The method according to claim 10, wherein the mounting the plurality of core members to the shaft includes mounting the plurality of core members to the shaft while rotationally stacking such that inclinations of two adjacent core members of the plurality of core members are alternately reversed in a state where the shaft is inserted into the shaft hole of each of the plurality of core members.

13. The method according to claim 1, wherein the mounting the plurality of core members to the shaft includes mounting the plurality of core members to the shaft while rotationally stacking such that inclinations of two adjacent core members of the plurality of core members are different from each other in a state where the shaft is inserted into the shaft hole of each of the plurality of core members.

14. The method according to claim 1, wherein the mounting the plurality of core members to the shaft includes mounting the plurality of core members to the shaft while rotationally stacking such that inclinations of two adjacent core members of the plurality of core members are alternately reversed in a state where the shaft is inserted into the shaft hole of each of the plurality of core members.

15. The method according to claim 1, wherein the pressing the plurality of stacked core members together includes giving the shaft hole of the stack as a whole a zig-zag shape.

16. The method according to claim 1, wherein the pressing the plurality of stacked core members together includes giving the shaft hole of the stack as a whole a triangular wave shape or sawtooth wave shape.

17. The method according to claim 1,
wherein the plurality of core members each includes a through hole, the through hole penetrating through each of the plurality of core members in the height direction thereof and obliquely extending in the height direction, and
wherein the pressing the plurality of stacked core members together includes pressing to align the through hole of each of the plurality of the core members, change an attitude of the through hole and form a magnet insert hole as a whole with a non-linear shape.

18. The method according to claim 1, wherein the pressing the plurality of stacked core members together includes an inner peripheral edge of the shaft hole of each of the plurality of core members biting into the shaft so that a gap size between an inner peripheral surface of the shaft hole of each of the plurality of core members and an outer peripheral surface of the shaft is not constant but changes in an extending direction of the shaft.

19. The method according to claim 1, wherein the pressing the plurality of stacked core members together includes an inner peripheral edge of the shaft hole of each of the plurality of core members biting into at the shaft so that an inner peripheral surface of the shaft hole of each of the plurality of core members is not entirely but partially in contact with an outer peripheral surface of the shaft.

* * * * *